US008365331B1

(12) United States Patent
Young

(10) Patent No.: US 8,365,331 B1
(45) Date of Patent: Feb. 5, 2013

(54) AUTO POWERED JACK APPARATUS

(76) Inventor: John D. Young, Eight Mile, AL (US)

(*) Notice: Subject to any disclaimer, the term of this patent is extended or adjusted under 35 U.S.C. 154(b) by 69 days.

(21) Appl. No.: 12/940,232

(22) Filed: Nov. 5, 2010

(51) Int. Cl.
B25F 1/00 (2006.01)
(52) U.S. Cl. ............... 7/100; 254/1; 254/423; 254/103; 362/119
(58) Field of Classification Search .................... 7/100; 81/15.2–15.7, 44
See application file for complete search history.

(56) References Cited

U.S. PATENT DOCUMENTS

| 3,645,501 | A | | 2/1972 | Musgrove |
| 4,653,727 | A | * | 3/1987 | Chang et al. ..................... 254/1 |
| 4,872,230 | A | | 10/1989 | Levine |
| 5,085,407 | A | * | 2/1992 | Lonon ........................... 254/103 |
| 5,441,237 | A | | 8/1995 | Sweeney |
| 5,599,204 | A | * | 2/1997 | Glassford ...................... 439/502 |
| 5,657,964 | A | | 8/1997 | Yoshida |
| 6,773,132 | B2 | * | 8/2004 | Gilligan et al. ............... 362/119 |
| 6,832,402 | B1 | * | 12/2004 | Drago et al. ..................... 7/100 |
| 6,877,200 | B2 | | 4/2005 | Villarreal |
| 6,991,221 | B1 | * | 1/2006 | Rodriguez ..................... 254/423 |
| 7,279,640 | B2 | * | 10/2007 | White et al. .................... 174/135 |
| 7,472,889 | B1 | * | 1/2009 | Prather ......................... 254/103 |
| 7,611,127 | B1 | * | 11/2009 | Moore ......................... 254/93 R |
| 8,112,837 | B1 | * | 2/2012 | Lopez ............................. 7/100 |

* cited by examiner

Primary Examiner — Monica Carter
Assistant Examiner — Melanie Alexander

(57) ABSTRACT

The auto powered jack apparatus provides for selective telescopic extension of the jack shaft. The telescopic jack is especially useful for lifting an auto. The jack is in removable communication with either the air compressor or the electrical inverter, both powered by a cigar lighter plug removably fitted into a cigar lighter. The apparatus also provides for wrenching any given object with the powered handgun shaped wrench. The jack is omni directionally operated so that objects may be separated as chosen and other functions performed with the jack. The inverter converts 12 volt auto power to 120 volt electrical power so that the wrench and jack are able to operate with sufficient power to lift a car and to remove and replace highly torqued auto items such as wheel lug nuts, as compared to 12 volt wrench and jack operations that are typically woefully inadequate when faced with laborious tasks.

4 Claims, 3 Drawing Sheets

AUTO POWERED JACK APPARATUS

BACKGROUND OF THE INVENTION

No automobile should be without a jack. However, mechanical jacks typically provided with most automobiles can be cumbersome in both storage and operation. The present apparatus is powered by an auto and is self-contained. The apparatus provides for both electrically inverted power and air power of the attached wrench. The apparatus importantly negates the space, difficulties, and frictional problems associated with mechanical jacks such as scissor jacks.

FIELD OF THE INVENTION

The auto powered jack apparatus relates to auto jacks and more especially to an auto powered jack apparatus with wrench, that may be employed in elevating a portion of an automobile and for any other use that selectively extends the attachable jack.

SUMMARY OF THE INVENTION

The general purpose of the auto powered jack apparatus, described subsequently in greater detail, is to provide an auto powered jack apparatus which has many novel features that result in an improved auto powered jack apparatus which is not anticipated, rendered obvious, suggested, or even implied by prior art, either alone or in combination thereof.

To attain this, the auto powered jack apparatus provides for selective telescopic extension of the jack shaft. The telescopic jack is especially useful for lifting an auto. The jack may be in removable communication with either the air compressor or the electrical inverter. Both are powered by a cigar lighter plug typically fitted into a cigar lighter of an automobile or other cigar lighter equipped vehicle or device. The apparatus also provides for wrenching any given object with the powered handgun shaped wrench with trigger. Also, the jack is omni directionally operated so that objects may be separated and supported as chosen and have other functions performed with the jack. Importantly, the inverter converts 12 volt auto power to 120 volt electrical power so that the wrench and the jack are able to operate with sufficient power to lift a car and to remove and replace highly torqued auto items such as wheel lug nuts, as compared to 12 volt wrench and jack operations that are typically woefully inadequate when faced with laborious tasks. The spring loaded up/down rocker switch is disposed within the circular base. The switch is returned to a neutral position when released so that the switch must be selectively positioned and held for jack operation to a given position.

It is important that the cylinder with telescopic shaft is offset from center atop the jack base. Many jacking and expansion situations require specifically focused and improved support that is directionally stable. The offset of the cylinder allows the jack to be biased toward a chosen direction. The circular base stabilizes the jack on a given surface, including a ground surface or a road surface, and is also superior to a rectangular base for such bias and in negating corners and edges that are prone to puncturing or compressing a the given surface. The rubberized jack pad is importantly circular in order to adapt best to a variety of contact surfaces. The jack and the wrench may be removable from the connections.

Thus has been broadly outlined the more important features of the improved auto powered jack apparatus so that the detailed description thereof that follows may be better understood and in order that the present contribution to the art may be better appreciated.

An object of the auto powered jack apparatus is to provide for power from an automobile.

Another object of the auto powered jack apparatus is to selectively provide for use of electrical auto power.

A further object of the auto powered jack apparatus is to be self-contained excepting the auto power provided.

An added object of the auto powered jack apparatus is to provide for conversion of electrical power to air power.

And, an object of the auto powered jack apparatus is to invert 12 volt power to 120 volt power.

Yet another object of the auto power jack apparatus is to negate the difficulties associated with a scissor jack and other purely mechanical jacks that require excessive storage space, offer difficulties in use, and are fraught with frictional issues.

These together with additional objects, features and advantages of the improved auto powered jack apparatus will be readily apparent to those of ordinary skill in the art upon reading the following detailed description of presently preferred, but nonetheless illustrative, embodiments of the improved auto powered jack apparatus when taken in conjunction with the accompanying drawings.

DETAILED DESCRIPTION OF THE DRAWINGS

With reference now to the drawings, and in particular FIGS. 1 through 4 thereof, the principles and concepts of the auto powered jack apparatus generally designated by the reference number 10 will be described.

Figure 1:
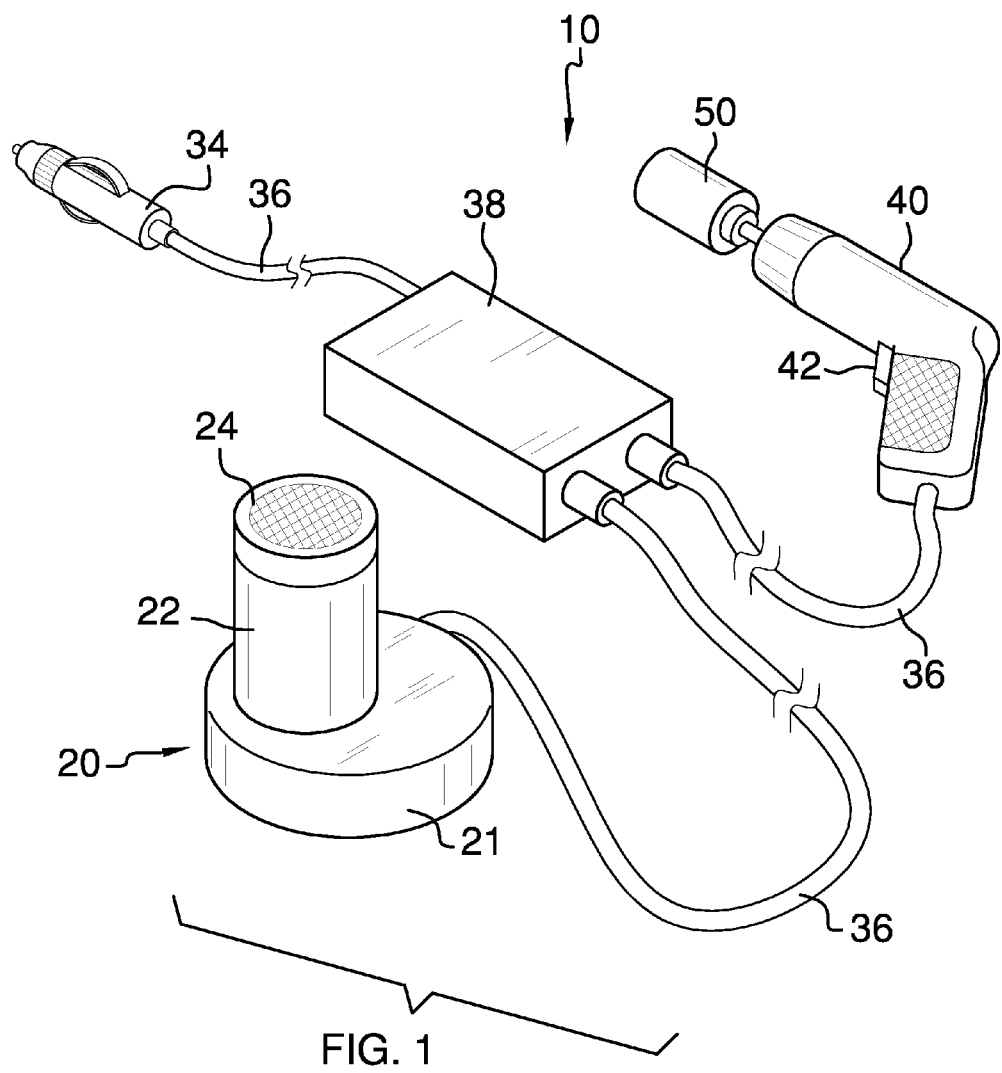
FIG. 1 is a perspective view of the apparatus with air inverter.

Referring to FIG. 1, the apparatus 10 partially comprises a jack 20 with a circular base 21. The circular base 21 has a cylinder 22 disposed atop the circular base 21 in an off-center position.

Figure 2:
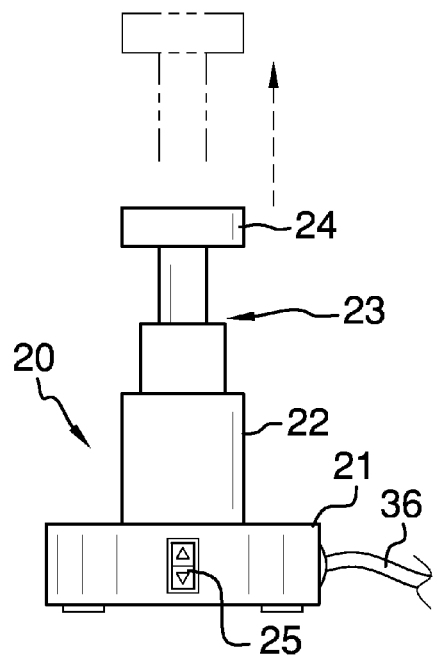
FIG. 2 is a lateral elevation view of the jack.
Figure 3:
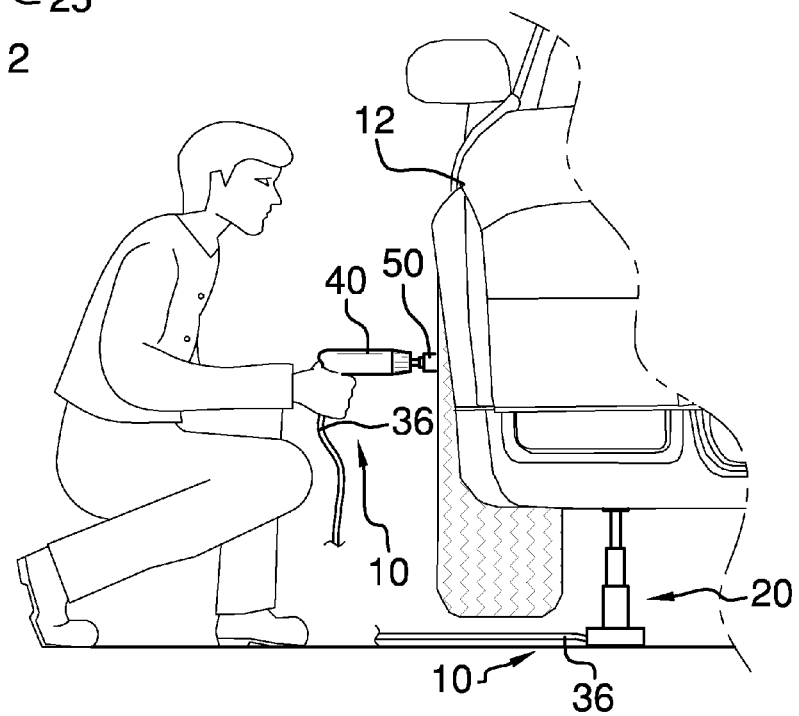
FIG. 3 is a lateral elevation view in use on an automobile.

Referring to FIG. 2, the jack 20 further comprises a cylindrical telescopic shaft 23 selectively extended from the cylinder 22. The circular rubberized jack pad 24 is disposed atop the cylindrical telescopic shaft 23. The spring loaded up/down rocker switch 25 is disposed within the circular base 21. The switch 25 is returned to a neutral position when released so that the switch 25 must be selectively positioned and held for the jack 20 cylindrical telescopic shaft 23 operation to a given extended or compressed position.

Referring again to FIG. 1, the inverter 38 is in communication with the circular jack 20. The inverter 38 converts 12 volt auto power to 120 volt power for the jack 20 and the wrench 40. The cigar lighter plug 34 is in communication with the inverter 38.

Referring to FIG. 3 and again to FIG. 1, the cigar lighter plug 34 is selectively inserted into an automobile 12 cigar lighter. The handgun shaped electric wrench 40 with trigger 42 is in communication with the inverter 38 via the connection 36. The socket 50 is removably fitted to the wrench 40.

Figure 4:
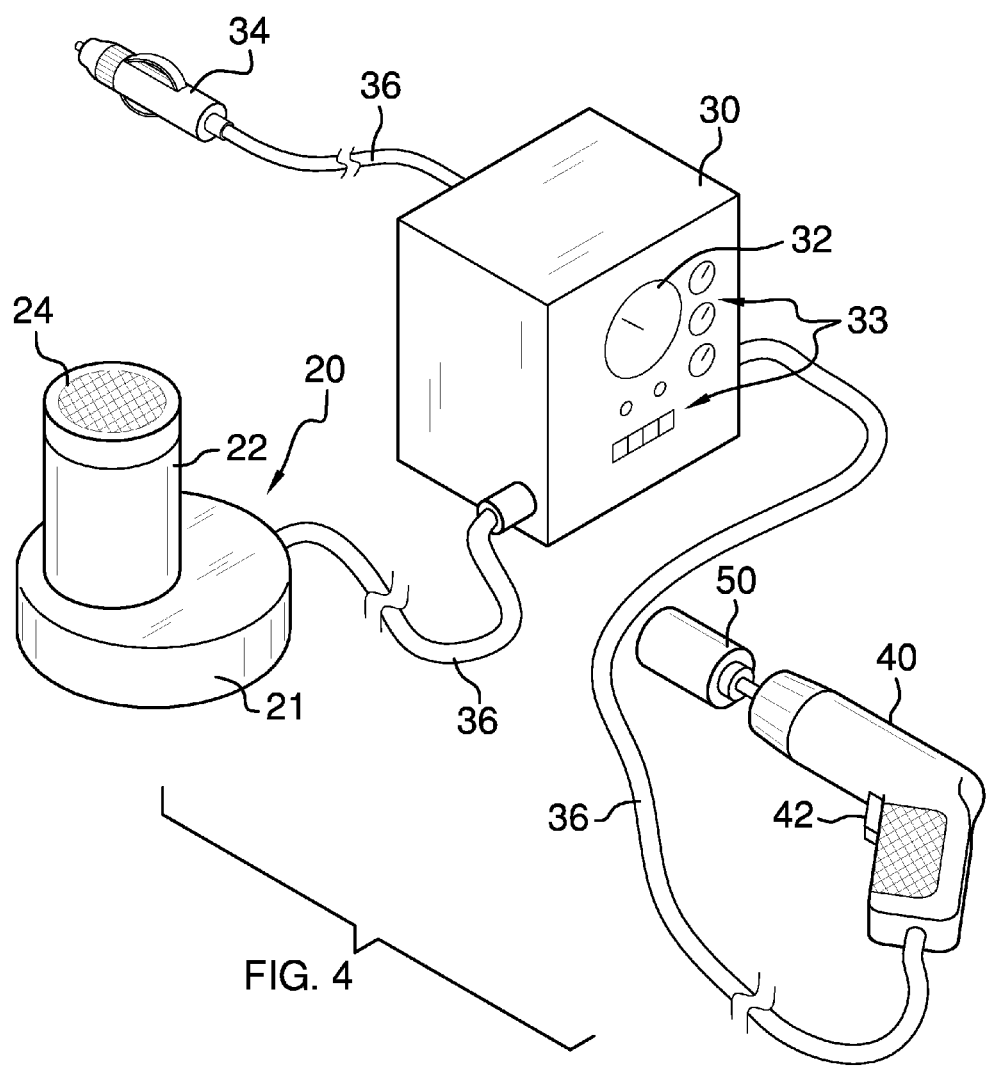
FIG. 4 is a perspective view of the apparatus with air compressor.

Referring to FIG. 4, the apparatus 10 departs from the exact components of FIG. 1 by substitution of the air compressor 30 for the inverter 38. The air compressor 30 is in removable communication with the jack 20. The air compressor 30 comprises a pressure gauge 32 and controls 33 visually disposed within the compressor 30.

The cigar lighter plug 34 is in communication with the air compressor 30. The handgun shaped pneumatic wrench 40 with trigger 42 is in removable communication with the air compressor 30 via the connection 36. The socket 50 is removably fitted to the pneumatic wrench 40. A plurality of existing sockets 50 may be used.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the auto powered jack apparatus may be used.

What is claimed is:

1. An auto powered jack apparatus comprising, in combination:
    a jack having a circular base, wherein the circular base is configured to stabilize the jack upon a given surface;
    a cylinder disposed atop the circular base in an off-center position;
    a cylindrical telescopic shaft selectively extended from the cylinder;
    a circular rubberized jack pad disposed atop the cylindrical telescopic shaft;
    a spring loaded up/down rocker switch disposed within the circular base, the switch returned to a neutral position when released;
    an inverter in communication with the circular jack;
    a cigar lighter plug in communication with the inverter, the cigar lighter plug selectively inserted into an automobile;
    a handgun shaped electric wrench with trigger in communication with the inverter; and
    a socket removably fitted to the electric wrench.

2. The apparatus according to claim 1 wherein the jack is in removable communication with the inverter; and
    the wrench in removable communication with the inverter.

3. An auto powered jack apparatus comprising, in combination:
    a jack having a circular base, wherein the circular base is configured to stabilize the jack upon a given surface;
    a cylinder disposed atop the circular base in an off-center position;
    a cylindrical telescopic shaft selectively extended from the cylinder;
    a circular rubberized jack pad disposed atop the cylindrical telescopic shaft;
    an air compressor in communication with the jack;
    a pressure gauge disposed within the air compressor;
    a controls disposed within the compressor;
    a cigar lighter plug in communication with the air compressor, the cigar lighter plug selectively inserted into an automobile;
    a handgun shaped pneumatic wrench with trigger in communication with the air compressor; and
    a socket removably fitted to the pneumatic wrench.

4. The apparatus according to claim 3 wherein the jack is in removable communication with the compressor; and
    the wrench in removable communication with the compressor.

* * * * *